(12) United States Patent
Chen et al.

(10) Patent No.: US 8,829,081 B2
(45) Date of Patent: Sep. 9, 2014

(54) METHOD OF MANUFACTURING CORE-SHELL SUBMICRON SPHERES

(75) Inventors: Hui Chen, Taipei (TW); Ming-Yu Lo, New Taipei (TW); Yu-Cheng Kuo, Taoyuan County (TW)

(73) Assignee: National Central University, Jhongli, Taoyuan County (TW)

( * ) Notice: Subject to any disclaimer, the term of this patent is extended or adjusted under 35 U.S.C. 154(b) by 425 days.

(21) Appl. No.: 13/427,361

(22) Filed: Mar. 22, 2012

(65) Prior Publication Data

US 2013/0102733 A1 Apr. 25, 2013

(30) Foreign Application Priority Data

Oct. 20, 2011 (TW) .............................. 100138109 A

(51) Int. Cl.
*C08F 265/06* (2006.01)
*C09D 183/04* (2006.01)
*C08G 77/20* (2006.01)

(52) U.S. Cl.
CPC ............ *C08F 265/06* (2013.01); *C09D 183/04* (2013.01); *C08G 77/20* (2013.01); *Y10S 525/902* (2013.01)
USPC ........... 523/201; 525/902; 525/212; 525/229; 525/301; 525/72

(58) Field of Classification Search
CPC ...... C08F 265/06; C09D 183/04; C08G 77/20
USPC ............ 525/902, 212, 229, 301, 72; 523/201
See application file for complete search history.

(56) References Cited

U.S. PATENT DOCUMENTS

| 2001/0016612 | A1* | 8/2001 | Kasai ............................ 523/201 |
| 2003/0018102 | A1* | 1/2003 | Weston et al. ................ 523/201 |
| 2007/0060702 | A1* | 3/2007 | Gao et al. ...................... 524/700 |
| 2009/0227451 | A1* | 9/2009 | Rose et al. .................... 504/100 |
| 2010/0069237 | A1 | 3/2010 | Yano et al. |

FOREIGN PATENT DOCUMENTS

| TW | 200946544 | 11/2009 |
| TW | I332966 | 11/2010 |

OTHER PUBLICATIONS

Z.-Z. Gu et al., Colloids and Surfaces A: Physiochem. Eng. Aspects, 302, 312-319, 2007.
S. Zhang et al., Journal of Colloid and Interface Science, 316, 168-174, 2007.

* cited by examiner

*Primary Examiner* — Mark Kaucher
(74) *Attorney, Agent, or Firm* — McClure, Qualey & Rodack, LLP

(57) ABSTRACT

A method of preparing core-shell submicron spheres is disclosed. The method comprises steps hereafter. An emulsion containing a core monomer is heated to a temperature of 10° C. below its boiling point to the boiling point. A core forming step is performed by adding an initiator solution to the heated emulsion to form cores by polymerizing the core monomer. When the conversion of the above polymerization is 10% to 95%, a shell forming step is performed by adding a shell monomer into the emulsion, at a temperature of 50° C. below the emulsion's boiling point to the boiling point thereof, to form shells, respectively surrounding the cores, by polymerizing the shell monomer.

10 Claims, 2 Drawing Sheets

METHOD OF MANUFACTURING CORE-SHELL SUBMICRON SPHERES

CROSS-REFERENCE TO RELATED APPLICATION

This application claims the priority benefit of Taiwan application serial no. 100138109, filed Oct. 20, 2011, the full disclosure of which is incorporated herein by reference.

BACKGROUND

1. Technical Field

The disclosure relates to a preparation method of core-shell microstructures. More particularly, the disclosure relates to a preparation method of core-shell microstructures without adding emulsifier.

2. Description of Related Art

Recently, polymer spheres are more widely applied with the progress of the design and synthesis of the polymer spheres. Generally, the surfaces of the polymer spheres can be chemically modified to have various functional groups for applying in various fields, such as oil paintings, cosmetics, drugs spacers of LCDs, and photonic crystal, etc.

In the prior arts, emulsion polymerization is usually used to prepare polymer spheres. However, the problem of emulsifier remnant limits the applicable fields of the polymer spheres. For solving the problem above, an emulsion polymerization without adding emulsifier was developed. However, when polymer spheres with core-shell structures need to be prepared, an emulsion of polymer spheres needs to be prepared first. Then, the polymer spheres are used as seeds to prepare shells enclosing the polymer spheres by seeded swelling polymerization. In more particularly, in the above seeded swelling polymerization, a shells monomer and a swelling agent have to be added to the emulsion of the polymer spheres at a certain temperature to swell the emulsion. Then, an initiator was added to start polymerizing the shell monomer. In addition to prepare the emulsion of polymer spheres in advance, the swelling time needed is about one day. Therefore, the preparation time is too long and the cost is thus too high. Accordingly, the seeded swelling polymerization is not suitably used to commercialize the preparation of the polymer spheres with core-shell structure and surface chemical modification.

SUMMARY

In one aspect, the present invention is directed to a method of preparing core-shell submicron spheres. The method is described as follow.

An emulsion is heated to a temperature from 10° C. below the emulsion's boiling point to the emulsion's boiling point. The emulsion comprises at least a core monomer being styrene, methyl methacrylate, n-butyl methacrylate, or any combinations thereof.

A core forming step is then performed by adding an aqueous solution of an initiator to the heated emulsion to form a plurality of cores composed of a core polymer polymerized by the core monomer. The weight ratio of the core monomer to the initiator is 20:1 to 1000:1.

Next, a shell forming step is performed by adding at least a shell monomer to the emulsion when the conversion rate of the polymerization is 10-95% at a temperature 50° C. below the emulsion's boiling point to the boiling point thereof, and then stirring the emulsion to form a plurality of shells respectively enclosing the cores and composed of a shell polymer polymerized by at least the shell monomer. The compositions of the core polymer and the shell polymer are different.

According to an embodiment of this invention, the emulsion in the heating step contains 5-20 wt % of the core monomer.

According to another embodiment of this invention, the emulsion in the heating step comprises a cross-linking reagent. The content of the cross-linking reagent in the total amount of the core monomer and the cross-reaction reagent is less than about 40 wt %.

According to yet another embodiment of this invention, the emulsion in the heating step comprises a hydrophilic comonomer to copolymerize with the core monomer, the content of the hydrophilic comonomer in the total amount of the core monomer and the hydrophilic comonomer is less than 10 wt %.

According to yet another embodiment of this invention, the shell monomer comprises an unsaturated monomer having at least a C=C double bond. The unsaturated monomer can be styrene, methyl methacrylate (MMA), n-butyl methacrylate (BMA), butyl acrylate (BA), sodium p-styrenesulfonate, N-isopropylacrylamide (NIPPAAm), or any combinations thereof.

According to yet another embodiment of this invention, a phase transition material can be further added to the emulsion in the shell forming step when the shell monomer is styrene or methyl methacrylate.

According to yet another embodiment of this invention, the shell monomer comprises a siloxane monomer having at least two alkoxy groups. The siloxane monomer can be tetraethyl orthosilicate, methyl triethoxysilane, dimethyl diethoxysilane, 3-methacryl-oxypropyl methyl dimethoxysilane, or any combinations thereof.

According to yet another embodiment of this invention, a functional powder can be further added to the emulsion in the shell forming step, wherein the functional powder can be $Fe_3O_4$, zirconium oxide, or a combination thereof.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

Many of the attendant features will be more readily appreciated as the same becomes better understood by reference to the following detailed description considered in connection with the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
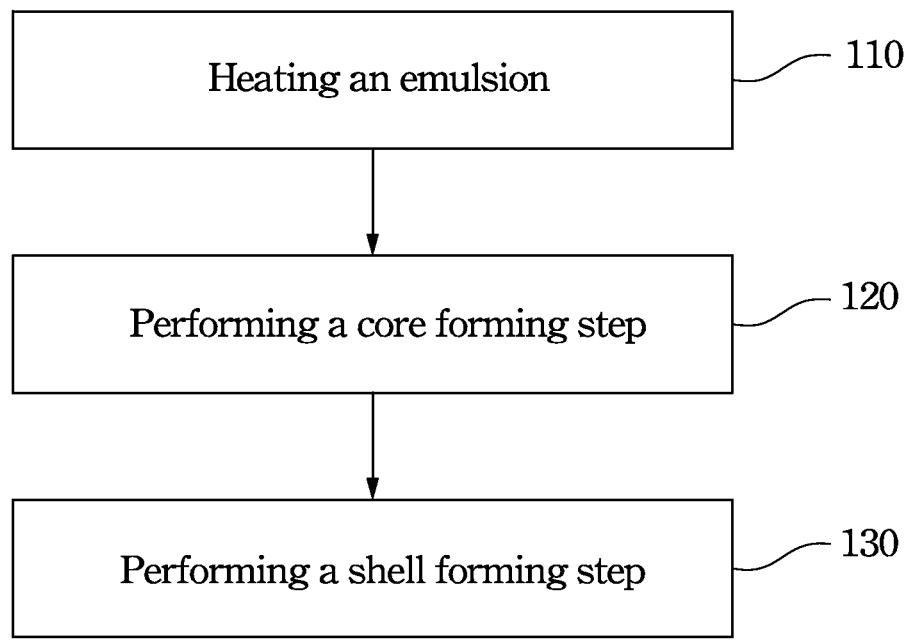
FIG. 1 is a process flow diagram of a method for preparing core-shell submicron spheres according to an embodiment of this invention.

FIG. 1 is a process flow diagram of a method for preparing core-shell submicron spheres according to an embodiment of this invention. The preparation method comprises heating an emulsion (step 110), performing a core forming step (step 120), and performing a shell forming step (step 130).

In the heating step 110, an emulsion containing at least a core monomer is heated to a temperature from 10° C. below the emulsion's boiling point to the emulsion's boiling point. According to an embodiment, when the bubbles, produced in the emulsion, can be observed by eyes, the next core forming step 120 can be started. The core monomer above can be styrene, methyl methacrylate, n-butyl methacrylate, or any combinations thereof, for example. The content of the core monomer in the emulsion is about 5-20 wt %.

According to an embodiment of this invention, the emulsion can contain no emulsifier. According to another embodiment, the emulsion can contain a small amount of emulsifier. Accordingly, the emulsifier content in the emulsion may be less than 2 cmc.

According to an optional choice of this invention, the emulsion can further has a hydrophilic comonomer to copolymerize with the core monomer above. The hydrophilic comonomer can be methacrylic acid (MAA).

According to another optional choice of this invention, the emulsion can further have a cross-linking reagent to increase the stability and hardness of the cores formed later. The cross-linking reagent above can be divinylbenzene or ethylene glycol dimethacrylate (EGDMA), for example.

In the core forming step 120, an aqueous solution of an initiator is added to the heated emulsion under stirring to form plural cores composed of a core polymer polymerized by the core monomer. The weight ratio of the core monomer to the initiator is 20:1 to 1000:1. The initiator above can be any compounds that can initiate the radical chain polymerization (also known as radical addition polymerization) of the core monomers above. Accordingly, the initiator can be potassium persulfate (KPS) or ammonium persulphate (APS).

The stirring method above can be performed by a magnetic stirring heat plate or other suitable heating and stirring devices. According to an embodiment, the rotor's rotating rate of the heating and stirring devices can be 200-1000 rpm, for example.

In the shell forming step 130, at least a shell monomer is added to the emulsion of the core forming step 120, when the conversion rate of the above radical chain polymerization is 10-95%. The temperature of the emulsion of this shell forming step 130 is better to be kept at a temperature of 50° C. below the emulsion's boiling point to the emulsion's boiling point. Under heating and stirring, plural shells respectively enclosing the cores and composed of a shell polymer polymerized by the shell monomer are formed. The compositions of the core polymer and the shell polymer can be the same or different according to the application purpose. In one embodiment, the shell forming step can be performed for 5 minutes to 2 hours. In another example, the weight ratio of the core monomer to the shell monomer is 1:0.05-1:8. The obtained core-shell submicron spheres have a diameter of 100 nm-10 μm.

The conversion rate of the polymerization means the weight percentage of the core monomer converting to the core polymer. The polymerization conversion rate can be quantitatively determined by gravimetric method. The calculation can be done by the following equation (1):

$$X(t)=(W_2/W_1)/W_a \times 100\% \quad (1)$$

$X(t)$ is the conversion rate at the sampling time t. $W_1$ is the emulsion's weight at the sampling time t. $W_2$ is the core polymer's weight at the sampling time t. $W_a$ is the core monomer's weight in 1 g of the emulsion before the polymerization. From the equation (1) above, the conversion rate is increased with increasing the polymerization's time. When different combinations of the core monomer and the comonomer are added, the conversion rates are also different. For example, when the core monomer is styrene and the comonomer is methacrylic acid, the polymerization conversion rate is faster than the polymerization conversion rate when only styrene is used to form the core polymer.

According to an embodiment, the shell monomer comprises an unsaturated monomer having at least one C=C double bond. In an embodiment, the unsaturated monomer can be styrene (St), methyl methacrylate (MMA), n-butyl methacrylate (BMA), butyl acrylate (BA), sodium p-styrenesulfonate, N-isopropylacrylamide, or any combinations thereof. In the shell forming step 130, the shell monomer can polymerized with the unreacted core monomer via radical polymerization. For example, when the core monomer is styrene (St), the comonomer is methacrylic acid (MAA), and the shell monomer is n-Butyl methacrylate (BMA), the obtained core-shell submicron spheres is poly(St-co-MAA)-poly(St-co-BMA).

In another embodiment, the shell monomer can be a siloxane monomer having at least two alkoxy groups. The siloxane can be tetraethyl orthosilicate, methyl triethoxysilane, dimethyl diethoxysilane, 3-methacryl-oxypropyl methyl dimethoxysilane, or any combinations thereof. The siloxane monomer above can be used to perform polycondensation reaction to form shells respectively enclosing the cores. For example, when the when the core monomer is styrene (St), the comonomer is methacrylic acid (MAA), and the shell monomer is tetraethyl orthosilicate (TEOS), the obtained core-shell submicron spheres is poly(St-co-MAA)-TEOS.

According to an optional choice of this invention, a functional powder can be added to the emulsion in the shell forming step 130. The functional powder cannot react with the shell monomer including the unsaturated monomer and the siloxane monomer above, and dispersed in the shell monomer. In one embodiment, the material of the functional powder can be $Fe_3O_4$, zirconium oxide, or a combination thereof. The $Fe_3O_4$ is a magnetic material, and the zirconium oxide is a material having high refractive index. The obtained core-shell submicron spheres containing the functional powder can be applied in a super critical fluid or a high refractive index film.

In another optional choice of this invention, a phase transition material can be further added to the emulsion in the shell forming step when the shell monomer is styrene or methyl methacrylate. In one embodiment, the phase transition material can be n-octadecane having a content below 60 wt % of the core monomer. The phase transition material can infiltrate the inside of the cores and disperse in the cores of the core-shell submicron spheres. Therefore, the phase transition material can be enclosed by the shell polymer. The core-shell submicron spheres containing the phase transition material can be applied in fabrics.

Embodiment 1

Adding a Certain Amount of Shell Monomer, BMA, at Various Conversion Rates

Figure 2:
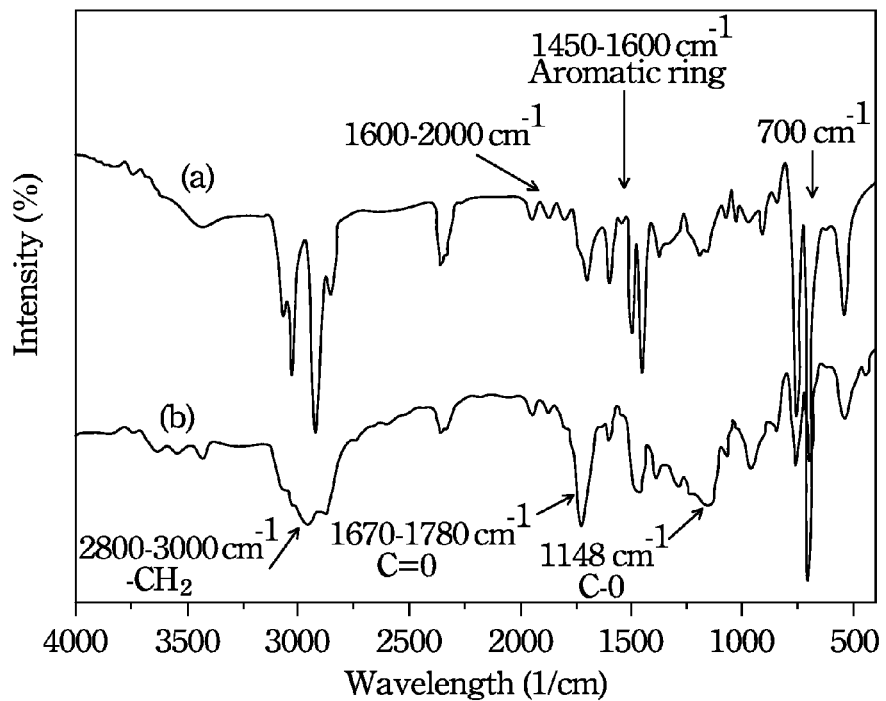
FIG. 2 is IR spectra of comparative example 1 (curve a) and example 4 (curve b).

In the Embodiment 1, the added core monomer was 10 g styrene, the added comonomer was 490 μl MMA, and the added shell monomer was 15 g BMA. In comparison example 1, only styrene and MMA were used to form the submicron spheres each having only the core without the shell. The BMA's addition amount and submicron spheres' diameters of the Comparative Example 1 and the Examples 1-4 are listed in the Table 1 below. The initiator is potassium persulfate having a concentration of 3.6 mM in the reaction system. The measured IR spectra of the Comparative Example 1 (curve a) and the Example 1 (curve b) are shown in FIG. 2.

The preparation method was as described above and illustrated in FIG. 1. The core monomer and the comonomer were added to 85 g of deionized water to form an emulsion. The emulsion was then heated and stirred, and the rotor's rotation rate is 560 rpm. When the emulsion was heated to the emulsion's boiling point for 3 minutes, 5 g of initiator aqueous solution was added to the heated emulsion to start the polymerization. Next, when the conversion rates of the polymerization were 20, 40, 60, and 80%, the shell monomer, BMA, was added to the emulsion to form core-shell submicron spheres of poly(St-co-MAA)-poly(St-co-BMA).

TABLE 1

Adding constant amount of BMA shell monomer at various conversion rates

| Sample | Conversion rate (%) | BMA (g) | Diameter of core-shell submicron spheres[1] (nm) |
|---|---|---|---|
| Comparative Example 1 | — | 0 | — |
| Example 1 | 20 | 15 | 263 |
| Example 2 | 40 | 15 | 279 |
| Example 3 | 60 | 15 | 273 |
| Example 4 | 80 | 15 | 282 |

[1]The number-averaged diameter is an average value of 100 core-shell submicron spheres measured via SEM observation.

FIG. 2 is IR spectra of comparative example 1 (curve a) and example 4 (curve b). From curves (a) and (b) in FIG. 2, it can be found that there are three benzene's absorption peaks of the styrene at 700, 1450-1600, and 1660-2000 $cm^{-1}$. However, the ester's absorption peaks of 1148 $cm^{-1}$ (C—O) and 1670-1780 $cm^{-1}$ (C=O), and the methylene's absorption peaks of 2800-3000 $cm^{-1}$ of BMA, only can be found in curve (b). Therefore, it can be sure that the BMA added in shell forming step can be successfully polymerized to form shells enclosing the polystyrene cores. Furthermore, from Examples 1-4 in Table 1, it can be known that the diameters of the core-shell submicron spheres are quite uniform when adding a certain amount of shell monomer at various conversion rate of the core polymerization. The obtained average diameter of Examples 1-4 is within the range of about 273±10 nm.

Embodiment 2

Adding Various Amounts of Shell Monomer, BMA, at a Certain Conversion Rate

In the Embodiment 2, the added core monomer was 10 g styrene, the added comonomer was 490 μl MMA, and the added shell monomer was BMA. The added amount of BMA is listed in Table 2 below. In comparison example 1, only styrene and MMA were used to form the submicron spheres each having only the core without the shell. The initiator is potassium persulfate having a concentration of 3.6 mM in the reaction system.

In Examples 5-9, the method of performing the core forming step was the same as the Embodiment 1, and hence omitted here. Next, when the conversion rate of polymerization in the core forming step was 80%, the shell monomer, BMA, was added to the emulsion to perform the shell forming step for 90 minutes. The obtained core-shell submicron spheres were poly(St-co-MAA)-poly(St-co-BMA), and the diameters of the obtained core-shell submicron spheres in Examples 5-9 are listed in Table 2 below.

TABLE 2

Adding various amounts of shell monomer, BMA, at 80% conversion rate

| Sample | BMA (g) | Diameter of core-shell submicron spheres[1] (nm) |
|---|---|---|
| Comparative Example 1 | 0 | 191 |
| Example 5 | 6 | 224 |
| Example 6 | 8 | 227 |
| Example 7 | 10 | 240 |
| Example 8 | 15 | 282 |
| Example 9 | 20 | 271 |

[1]The number-averaged diameter is an average value of 100 core-shell submicron spheres measured via SEM observation.

From the result of Table 2, it can be known that the addition amount of the shell monomer, BMA, can significantly affect the diameter of the obtained core-shell submicron spheres. The diameter of the core-shell submicron spheres was increased with the increase of the BMA's addition amount to 15 g. The diameter of the core-shell submicron spheres was slightly decreased when the BMA's addition amount is further increased to 20 g.

Embodiment 3

Adding Various Ratios of Shell Monomers, BA and BMA, at a Certain Conversion Rate In this Embodiment 3, the added core monomer was 10 g styrene, the added comonomer was 490 μl MMA, and the added shell monomer was BMA and BA in a total amount of 10 g. The addition amount of BA was respectively 20, 40, and 60 wt % of the total amount of the shell monomers for Examples 10-12. The initiator is potassium persulfate having a concentration of 3.6 mM in the reaction system.

In Examples 10-12, the method of performing the core forming step was the same as the Embodiment 1, and hence omitted here. Next, when the conversion rate of polymerization in the core forming step was 80%, the shell monomer, BMA and BA, was added to the emulsion to perform the shell forming step for 90 minutes. The obtained core-shell submicron spheres were poly(St-co-MAA)-poly(St-co-BMA-co-BA), and the diameters of the obtained core-shell submicron spheres in Examples 10-12 are listed in Table 3 below.

TABLE 3

Adding various ratios of shell monomers, BA and BMA in a total amount of 10 g, at 80% conversion rate

| Sample | BA/(BMA + BA) (wt %) | Diameter of core-shell submicron spheres[1] (nm) | Tg (° C.)[2] core | shell |
|---|---|---|---|---|
| Comparative Example 2 | 0 | 240 | 101.1 | 46.3 |
| Example 10 | 20 | 244 | 95.8 | 28.0 |
| Example 11 | 40 | 237 | 96.9 | 19.0 |
| Example 12 | 60 | — | 96.2 | 14.9 |

TABLE 3-continued

Adding various ratios of shell monomers, BA and BMA in a total amount of 10 g, at 80% conversion rate

| Sample | BA/(BMA + BA) (wt %) | Diameter of core-shell submicron spheres[1] (nm) | Tg (° C.)[2] core | shell |
|---|---|---|---|---|

[1]The number-averaged diameter is an average value of 100 core-shell submicron spheres measured via SEM observation.
[2]measured by differential scanning calorimetry (DSC)

From the results of Table 3, it can be known that the diameters of the core-shell submicron spheres did not change too much when the addition amount of BA was increased. The obtained diameters were about 240±4 nm. However, the glass transition temperature (Tg) was decreased when the BA addition amount was increased. When the addition amount of BA was 60%, the Tg of the shell polymer was only 14.9° C., which is slightly below room temperature. Therefore, the shell monomer of the Example 12 started softening at room temperature.

Embodiment 4

Adding a Certain Amounts of Shell Monomer, NaSS, at Various Conversion Rates

In this Embodiment 4, the added core monomer was 9 g styrene, the added comonomer was 490 μl MMA, and the added shell monomer was 1 g sodium p-styrenesulfonate (NaSS). The initiator is potassium persulfate having a concentration of 3.6 mM in the reaction system.

In Examples 13-16, the method of performing the core forming step was the same as the Embodiment 1, and hence omitted here. Next, when the conversion rates of polymerization in the core forming step were respectively 40, 60, 80, 90%, the shell monomer, NaSS, was added to the emulsion to prepare core-shell submicron spheres, poly(St-co-MAA)-poly(St-co-NaSS). In addition, since NaSS is negatively charged, the condition of the shells enclosing the cores can be inferred by analyzing the surface potential of the obtained core-shell submicron spheres. The diameters and the surface potential analysis result of Examples 13-16 are listed in Table 4 below.

TABLE 4

Adding a certain amount of shell monomer, NaSS, at various conversion rates

| Examples | Core's Conversion Rate (%) | Core's Diameter (nm)[1] | Diameter of core-shell submicron spheres (nm)[1] | Core's Surface Potential (Zeta potential)[2] | Shell's Surface Potential (Zeta potential)[2] |
|---|---|---|---|---|---|
| 13 | 40 | 117 | 138 | −26.9 | −39.2 |
| 14 | 60 | 138 | 156 | −25.8 | −51.4 |
| 15 | 80 | 146 | 163 | −27.5 | −61.2 |
| 16 | 90 | 150 | 152 | −19.7 | −42.2 |

[1]The number-averaged diameter is an average value of 100 core-shell submicron spheres measured via SEM observation.
[2]Analyzed by Dynamic Light Scattering (DLS)

From the results of Table 4, it can be known that the shell's surface potential was more negative when the shell monomer, NaSS, was added when the conversion rate of the polymerization in the core forming step was increased from 40% to 80%. It means that the amount of the shell monomer, NaSS, in the shell polymer was increased.

Embodiment 5

Adding Various Amount of Shell Monomer, NIPPAAm, at a Certain Conversion Rate

In Embodiment 5, the added core monomer was 10 g butylmethacrylate, and the added shell monomer was varied amount of N-isopropylacrylamide (NIPPAAm). The added amounts of NIPPAAm of Examples 17-21 were listed in Table 5. The initiator is potassium persulfate having a concentration of 3.6 mM in the reaction system.

In Examples 17-21, the method of performing the core forming step was the same as the Embodiment 1, and hence omitted here. Next, when the conversion rates of polymerization in the core forming step were respectively 80%, the shell monomer, NIPPAAm, was added to the emulsion to prepare core-shell submicron spheres, polyBMA/poly(BMA-co-NIPPAAm). Since NIPPAAm has nitrogen element, the condition of the shells enclosing the cores can be inferred by analyzing the surface nitrogen amount of the obtained core-shell submicron spheres. The elemental analysis results of Examples 17-21 were listed in Table 5 below.

TABLE 5

Adding various amounts of shell monomer, NIPPAAm, at 80% conversion rate

| Examples | NIPPAAm (g) | Elemental Content (%)[1] | | |
|---|---|---|---|---|
| | | C | O | N |
| 17 | 0.5 | 81.8 | 17.1 | 1.1 |
| 18 | 1.3 | 81.2 | 17.3 | 1.5 |
| 19 | 1.7 | 81.0 | 17.4 | 1.7 |
| 20 | 2.0 | 80.5 | 17.5 | 2.1 |
| 21 | 2.3 | 83.2 | 15.1 | 1.7 |

[1]measured by multiplex scan of Auger spectrum

From Table 5, it can be known that the shell polymer contains NIPPAAm. The nitrogen amount in the surface of the core-shell submicron spheres was increased when the added amount of NIPPAAm was increased from 0.5 g to 2.0 g, and slightly decreased when the added amount of NIPPAAm was further increased to 2.3 g.

Embodiment 6

Relation Between Various Adding Amount of Shell Monomer and Diameters of Core-Shell Submicron Spheres In this Embodiment 6, the added core monomer was BMA, the added comonomer was 490 μl methacrylic acid (MAA), and the added shell monomer was methyl methacrylate (MMA). The added amounts of the shell monomer, MMA, were 0, 1, 2, 3, 4, 5, 6, 7, and 8 times of the added total amount of the core monomer and the comonomer. The initiator is potassium persulfate having a concentration of 3.6 mM in the reaction system.

The method of performing the core forming step was the same as the Embodiment 1, and hence omitted here. Next, when the conversion rate of polymerization in the core forming step was 80%, the shell monomer, MMA, was added to the emulsion to prepare core-shell submicron spheres, poly(BMA-co-MAA)-poly(BMA-co-MMA). Then, the number-averaged diameters of the core-shell submicron spheres were measured. The obtained results were shown in FIG. 3.

Figure 3:
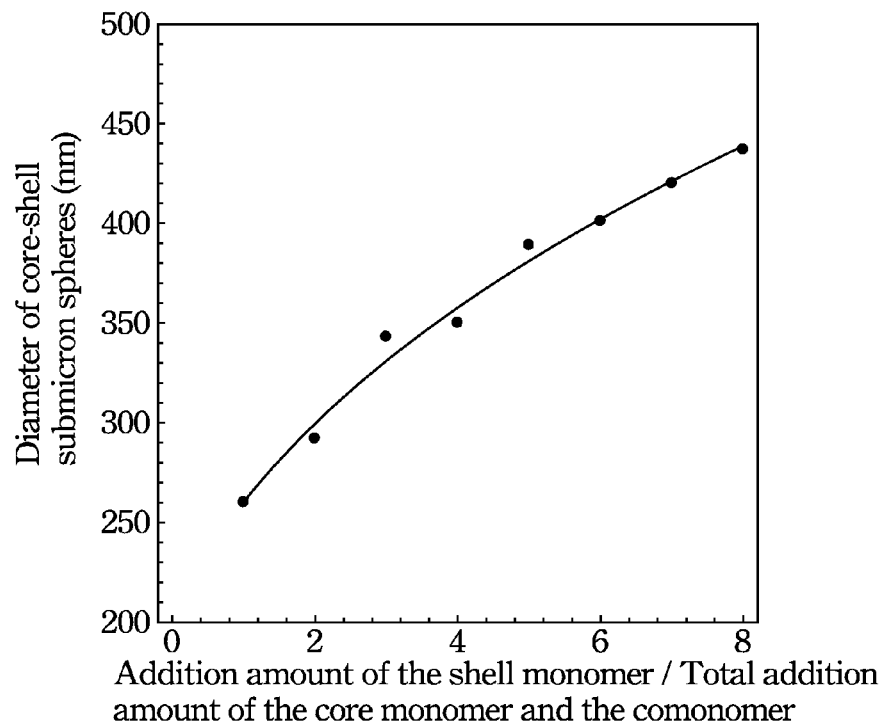
FIG. 3 is a diagram showing the relation between the diameters of the core-shell submicron spheres and the added amount of the shell monomer, MMA.

FIG. 3 is a diagram showing the relation between the diameters of the core-shell submicron spheres and the added amount of the shell monomer, MMA. From FIG. 3, it can be known that the diameter of the core-shell submicron spheres was about linearly increased with the increase of the added amount of the shell monomer.

Embodiment 7

Adding Various Amounts of Various Siloxane Monomers at a Constant Conversion Rate In this Embodiment 5, the added core monomer was 10 g styrene, the added comonomer was 490 µl methacrylic acid (MAA). The added shell monomers were tetraethyl orthosilicate (TEOS) in Examples 22-25, DMDESmethyl triethoxysilane (MTES) in Examples 26-29, dimethyl diethoxysilane (DMDES) in Examples 30-33, and MPS (methacryloxypropyltrimethoxy) in Examples 34-36. The initiator is potassium persulfate having a concentration of 3.6 mM in the reaction system.

The method of performing the core forming step was the same as the Embodiment 1, and hence omitted here. Next, when the conversion rate of polymerization in the core forming step was 80%, the shell monomers were added to the emulsion to prepare core-shell submicron spheres of poly(St-co-MAA)-TEOS, poly(St-co-MAA)-MTES, poly(St-co-MAA)-DMDES, and poly(St-co-MAA)-MPS. The addition amount of the various shell monomers and the measured diameter are listed in Table 6 below.

TABLE 6

Adding various amounts of various siloxane monomers at 80% conversion rate of the core forming step

| Examples | TEOS (g) | MTES (g) | DMDES (g) | MPS (g) | Diameter of core-shell submicron spheres (nm)[1] |
|---|---|---|---|---|---|
| 22 | 1 | — | — | — | 183 |
| 23 | 2 | — | — | — | 188 |
| 24 | 3 | — | — | — | 195 |
| 25 | 4 | — | — | — | 202 |
| 26 | — | 1 | — | — | 178 |
| 27 | — | 2 | — | — | 182 |
| 28 | — | 3 | — | — | 182 |
| 29 | — | 4 | — | — | 211 |
| 30 | — | — | 1 | — | 180 |
| 31 | — | — | 2 | — | 192 |
| 32 | — | — | 3 | — | 200 |
| 33 | — | — | 4 | — | 187 |
| 34 | — | — | — | 1 | 184 |
| 35 | — | — | — | 2 | 188 |
| 36 | — | — | — | 3 | 196 |

[1]The number-averaged diameter is an average value of 100 core-shell submicron spheres measured via SEM observation.

From Table 6, it can be known that the diameters of the obtained core-shell submicron spheres were increased with the increase of the addition amount of the shell monomers of TEOS, MTES, DMDES, and MPS.

Embodiment 8

Adding Various Amounts of Phase Transition Materials

In the core forming step of this embodiment, the added core monomer was 8 g styrene, the added comonomer was 490 µl methacrylic acid (MAA), and the added cross-linking reagent was ethylene glycol dimethacrylate (EGDMA). In the shell forming step of this embodiment, the added shell monomer was methacrylic acid (MAA), the added cross-linking reagent was ethylene glycol dimethacrylate (EGDMA), and the added phase transition material was n-octadecane. The total weight of the shells, and the n-octadecane content are listed in Table 7 below.

The method of performing the core forming step was the same as the Embodiment 1, and hence omitted here. Next, when the conversion rate of polymerization in the core forming step was 80%, the shell monomers were added to the emulsion to prepare core-shell submicron spheres of poly(St-co-MAA-EGDMA)-poly(St-co-MMA-EGDMA). The measured enthalpy of the obtained core-shell submicron spheres is listed in Table 7 below.

TABLE 7

Adding various amounts of phase transition material, n-octadecane

| Examples | total weight of the shells (g) | n-octadecane content (wt %) | enthalpy of core-shell submicron spheres (J/g)[1] |
|---|---|---|---|
| 37 | 10 | 0.46 | 1.16 |
| 38 | 15 | 0.74 | 1.89 |
| 39 | 20 | 37.2 | 94.4 |

[1]measured by DSC

From Table 7, it can be known that the enthalpy of the obtained core-shell submicron spheres was increased with the increase of the n-octadecane content.

Accordingly, from the disclosure above, it can be known that core-shell submicron spheres can be prepared by continuously heating and stirring an emulsion. The preparation method disclosed above has advantages of short time and simple apparatus. Furthermore, the obtained core-shell submicron spheres have uniform diameters. In addition, a phase transition material or a functional powder can be included in the structure of the core-shell submicron spheres to increase the application range of the obtained core-shell submicron spheres. The application range includes coating material, drug delivery system, filling particles in chromatography column, and photonic crystal, etc. Therefore, applying the preparation method disclosed above can not only solve the problem of the emulsifier remnants, and has the advantages of simple process, low cost, and mass-production, but also can be widely applied in a broader range.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A method of preparing core-shell submicron spheres, comprising:
   heating an emulsion to a temperature from 10° C. below the emulsion's boiling point to the emulsion's boiling point, the emulsion comprises at least a core monomer being styrene, methyl methacrylate, n-butyl methacrylate, or any combinations thereof;
   performing a core forming step by adding an aqueous solution of an initiator to the heated emulsion to form a plurality of cores composed of a core polymer polymerized by the core monomer, wherein the weight ratio of the core monomer to the initiator is 20:1 to 1000:1; and performing a shell forming step by adding at least a shell monomer to the emulsion when the conversion rate of the polymerization is 10-95% at a temperature 50° C. below the emulsion's boiling point to the boiling point thereof, and then stirring the emulsion to form a plurality of shells respectively enclosing the cores and composed of a shell polymer polymerized by at least the shell monomer, wherein the compositions of the core polymer and the shell polymer are different, and wherein the shell forming step includes adding a phase transition material to the emulsion, wherein the phase transition material is n-octadecane less than 60 wt % of the unsaturated monomer.

2. The method of claim 1, wherein the emulsion in the heating step contains 5-20 wt % of the core monomer.

3. The method of claim 1, wherein the emulsion in the heating step comprises a cross-linking reagent, and the content of the cross-linking reagent in the total amount of the core monomer and the cross-linking reagent is less than about 40 wt %.

4. The method of claim 1, wherein the emulsion in the heating step comprises a hydrophilic comonomer to copolymerize with the core monomer, the content of the hydrophilic comonomer in the total amount of the core monomer and the hydrophilic comonomer is less than 10 wt %.

5. The method of claim 1, wherein the shell monomer comprises an unsaturated monomer having at least a C=C double bond.

6. The method of claim 5, wherein the unsaturated monomer is styrene, methyl methacrylate, n-butyl methacrylate, butyl acrylate, sodium p-styrenesulfonate, N-isopropylacrylamide, or any combinations thereof.

7. The method of claim 6, wherein the phase transition material is added to the emulsion in the shell forming step when the shell monomer is styrene or methyl methacrylate.

8. The method of claim 1, wherein the shell monomer comprises a siloxane monomer having at least two alkoxy groups.

9. The method of claim 8, wherein the siloxane monomer is tetraethyl orthosilicate, methyl triethoxysilane, dimethyl diethoxysilane, 3-methacryl-oxypropyl methyl dimethoxysilane, or any combinations thereof.

10. The method of claim 1, further comprising adding a functional powder to the emulsion in the shell forming step, wherein the functional powder is $Fe_3O_4$, zirconium oxide, or a combination thereof.

* * * * *